(12) United States Patent
Yoneoka (10) Patent No.: US 11,093,578 B2
(45) Date of Patent: Aug. 17, 2021

(54) OPTIMIZATION DEVICE AND METHOD OF CONTROLLING OPTIMIZATION DEVICE

(71) Applicant: FUJITSU LIMITED, Kawasaki (JP)

(72) Inventor: Noboru Yoneoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 16/564,788

(22) Filed: Sep. 9, 2019

(65) Prior Publication Data

US 2020/0110790 A1 Apr. 9, 2020

(30) Foreign Application Priority Data

Oct. 4, 2018 (JP) .............................. JP2018-189001

(51) Int. Cl.
*G06F 17/11* (2006.01)
*G06F 7/57* (2006.01)
*G06F 7/58* (2006.01)

(52) U.S. Cl.
CPC ................ *G06F 17/11* (2013.01); *G06F 7/57* (2013.01); *G06F 7/58* (2013.01)

(58) Field of Classification Search
CPC ............... G06F 17/11; G06F 7/57; G06F 7/58
See application file for complete search history.

(56) References Cited

U.S. PATENT DOCUMENTS

2015/0278408 A1* 10/2015 Yoshimura .............. G06F 30/20
703/2
2017/0351947 A1 12/2017 Tamura et al.
2018/0075342 A1 3/2018 Tamura et al.

FOREIGN PATENT DOCUMENTS

JP          9-319721       12/1997
JP        2017-219948      12/2017

OTHER PUBLICATIONS

Extended European Search Report dated Mar. 2, 2020 from European Application No. 19196941.9, 9 pages.

* cited by examiner

*Primary Examiner* — Michael D. Yaary
(74) *Attorney, Agent, or Firm* — Staas & Halsey LLP (57) ABSTRACT

An optimization device includes M-stage arithmetic processing circuits connected in a ring shape, wherein each circuit determines whether to permit updating for each of first bits, a number of the first bits being obtained by dividing a number of second bits corresponding to all spins of an Ising model by M; selects one update candidate bit from among update permission bits; and updates a value of any one of the second bits based on identification information supplied from a last stage circuit to a top stage circuit, wherein each circuit other than the top stage circuit selects identification information of the one update candidate bit at a first probability obtained by dividing a number of the update permission bits by a sum of the number of the update permission bits and a number supplied from a previous stage circuit, and supplies the selected identification information to a subsequent stage circuit.

5 Claims, 8 Drawing Sheets

OPTIMIZATION DEVICE AND METHOD OF CONTROLLING OPTIMIZATION DEVICE

CROSS-REFERENCE TO RELATED APPLICATION

This application is based upon and claims the benefit of the prior Japanese Patent Application No. 2018-189001, filed on Oct. 4, 2018, the entire contents of which are incorporated herein by reference.

FIELD

The embodiments discussed herein are related to an optimization device and a method of controlling the optimization device.

BACKGROUND

In the related art, there is a method of calculating a multivariable optimization problem, at which a Neumann-type computer is not effective, by an optimization device (also called Ising machine or Boltzmann machine) using an Ising-type energy function. The optimization device replaces the problem to be calculated with an Ising model which represents the behavior of a spin of a magnetic substance, and calculates the problem.

The optimization device may model the problem using, for example, a neural network. In that case, each of a plurality of bits corresponding to all spins included in the Ising model functions as a neuron that outputs 0 or 1 depending on a value of another bit and a weighting factor (also referred to as a coupling factor) indicating the magnitude of interaction between the another bit and its own bit. For example, the optimization device uses a stochastic search method such as simulated annealing to obtain, as a solution, a combination of values of bits that may obtain the minimum value of the energy function value (hereinafter, referred to as energy) of the Ising model.

In the related art, there is an optimization device that calculates the combination of values of bits that minimizes energy by performing the simulated annealing using a digital circuit. In the optimization device of the related art, an update of a state is repeated in the manner that one bit is taken as a target per update among all bits of the Ising model.

As the number of bits in the Ising model increases with the increase in scale of the optimization problem, the number of weighting factors also increases. When the interaction between all bits is considered, the number of weighting factors is the square of the number of bits.

Related techniques are disclosed in, for example, Japanese Laid-open Patent Publication No. 2017-219948 and Japanese Laid-open Patent Publication No. 09-319721.

In order to cope with the increase in the number of bits, there is a method to increase the scale of the optimization device by distributing and holding weighting factors in a plurality of arithmetic processing units (e.g., single-chip semiconductor integrated circuits, respectively), and causing each arithmetic processing unit to perform the arithmetic operation on a portion of all bits. However, since each of the plurality of arithmetic processing units does not independently perform the process of selecting one update target bit from all the bits, it is not easy to appropriately select one update target bit when the plurality of arithmetic processing units are used. Thus, in general, it is difficult to achieve a large scale of the optimization device using a plurality of arithmetic processing units.

SUMMARY

According to an aspect of the present invention, an optimization device includes M-stage (M is an integer of 2 or more) arithmetic processing circuits connected in a ring shape, wherein each arithmetic processing circuit of the M-stage arithmetic processing circuits includes: determination circuit configured to determine whether to permit updating for each of first bits based on information of an Ising model, a number of the first bits being obtained by dividing a number of second bits corresponding to all spins of the Ising model by M, the Ising model being obtained by converting an optimization problem; a first selection circuit configured to: select one update candidate bit from among update permission bits, for which updating is permitted, based on a determination result of the determination circuit; and output identification information of the one update candidate bit; a count circuit configured to count a number of the update permission bits; and a state update circuit configured to update a value of any one of the second bits based on identification information supplied from a last stage arithmetic processing circuit of the M-stage arithmetic processing circuits to a top stage arithmetic processing circuit of the M-stage arithmetic processing circuits, wherein each arithmetic processing circuit of the M-stage arithmetic processing circuits other than the top stage arithmetic processing circuit includes: a second selection circuit configured to: select first identification information output from the first selection circuit at a first probability obtained by dividing the number of the update permission bits by a sum of the number of the update permission bits and a number supplied from a previous stage arithmetic processing circuit; and select second identification information supplied from the previous stage arithmetic processing circuit at a second probability obtained by subtracting the first probability from 1, wherein the second selection circuit of the last stage arithmetic processing circuit is configured to supply the selected identification information to the top stage arithmetic processing circuit, wherein each of the second selection circuits other than the second selection circuit of the last stage arithmetic processing circuit is configured to supply the selected identification information to a subsequent stage arithmetic processing circuit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, embodiments of the present disclosure will be described with reference to the accompanying drawings.

An optimization device described below searches for the value of each bit (the base state of Ising model) when an energy function has the minimum value, among the combinations of each value of a plurality of bits corresponding to all spins of an Ising model obtained by converting an optimization problem to be calculated.

An Ising-type energy function $E(x)$ is defined, for example, by the following equation (1).

(Equation 1)

$$E(x) = -\sum_{\langle i,j \rangle} W_{ij} x_i x_j - \sum_i b_i x_i \qquad (1)$$

The first item on the right side is an integration of the product of values (0 or 1) of two bits and a weighting factor, for all combinations of all bits of the Ising model, without omission and duplication. The symbol $x_i$ is a variable (also referred to as a state variable) that represents a value of a bit having "i" as identification information (hereinafter, referred to as an index), the symbol $x_j$ is a variable that represents a value of a bit of an index=j, and the symbol $W_{ij}$ is a weighting factor that represents the magnitude of interaction between the bits of index=i and j. In addition, $W_{ii}$=zero (0). In addition, in many cases, $W_{ij}$=$W_{ji}$ (that is, a factor matrix of weighting factors is often a symmetric matrix). Further, the weighting factor $W_{ij}$ has a predetermined bit width (e.g., 16 bits, 32 bits, 64 bits, 128 bits, etc.).

The second item on the right side is a total sum of the product of a bias factor of each bit and a variable representing a bit value, for all the bits. The symbol $b_i$ represents a bias factor of a bit with an index "i."

When the variable $x_i$ changes to $1-x_i$, the increment of the variable $x_i$ may be expressed as $\Delta x_i = (1-x_i) - x_i = 1-2x_i$. The energy change $\Delta E_i$ accompanied by the spin inversion (change in bit value) is expressed by the following equation (2).

(Equation 2)

$$\Delta E_i = E(x)|_{x_i \to 1-x_i} - E(x) = -\Delta x_i \left( \sum_j W_{ij} x_j + b_i \right) = -\Delta x_i h_i \qquad (2)$$

In the equation (2), $\Delta x_i$ becomes $-1$ when the variable $x_i$ changes from 1 to 0, and becomes 1 when the variable $x_i$ changes from 0 to 1. The symbol $h_i$ is called a local field, and the energy change $\Delta E_i$ is obtained by multiplying the local field $h_i$ by a sign ($+1$ or $-1$) according to $\Delta x_i$.

In addition, the change amount $\Delta h_i$ of the local field $h_i$ when the variable $x_j$ changes from 0 to 1 may be expressed as $+W_{ij}$, and the change amount $\Delta h_i$ of the local field $h_i$ when the variable $x_j$ changes from 1 to 0 may be expressed as $-W_{ij}$. Therefore, it is unnecessary to recalculate the local field $h_i$ each time by a matrix operation, and it is sufficient to add or subtract $W_{ij}$ by the change amount due to a bit that has changed along with a state transition.

First Embodiment

Figure 1:
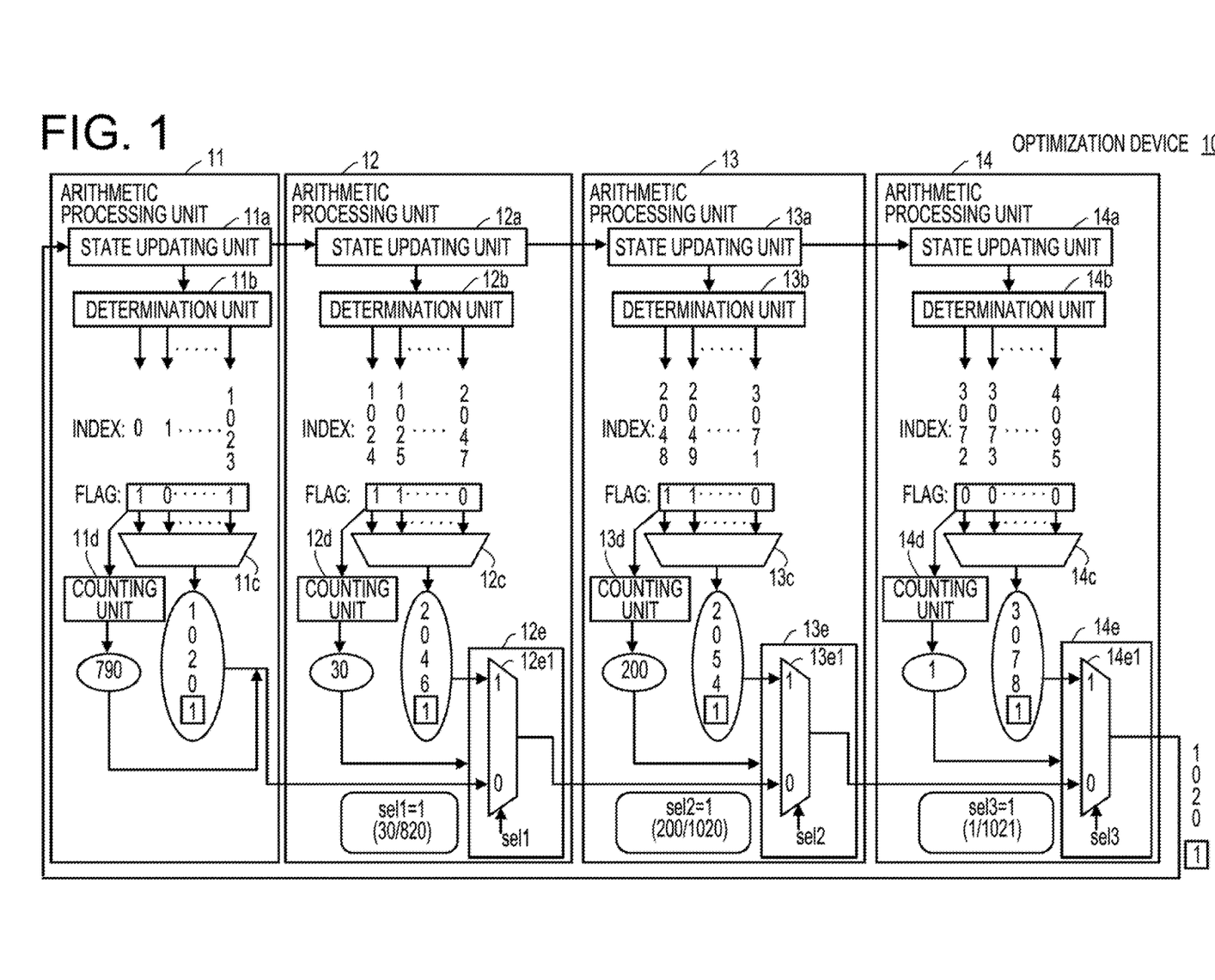
FIG. 1 is a view illustrating an example of an optimization device according to a first embodiment.

FIG. 1 is a view illustrating an example of an optimization device according to a first embodiment.

An optimization device 10 according to the first embodiment includes four stages of arithmetic processing units 11, 12, 13, and 14 that are connected to each other in a ring shape and search for the ground state of an Ising model. The number of stages of arithmetic processing units is not limited to four, but may be M that is an integer of 2 or more. Each of the arithmetic processing units 11 to 14 is, for example, a single-chip semiconductor integrated circuit (e.g., an application specific integrated circuit (ASIC), a field-programmable gate array (FPGA) or the like). In addition, the arithmetic processing units 11 to 14 may be provided, for example, in the single-chip semiconductor integrated circuit.

In the optimization device 10, since the process of updating the state of the Ising model is repeated many times, it is desirable that the arithmetic processing units 11 to 14 exchange the information at a high speed. Therefore, it is desirable that the arithmetic processing units 11 to 14 be connected to each other by a dedicated bus capable of conducting a higher-speed communication than a bus used for setting information, etc. of the Ising model in the arithmetic processing units 11 to 14. However, there are physical restrictions in the dedicated bus. For example, when the communication speed of the dedicated bus is 100 Gbps, 500 bits/cycle is the upper limit of the data transfer rate of the dedicated bus when the arithmetic processing units 11 to 14 operate at a clock frequency of 200 MHz. For example, since the total information amount of an index (10 bits) of each of 1,024 bits and a determination result (1 bit) of whether to permit updating is 11,264 bits, the information may not be transmitted and received in one clock cycle via the dedicated bus described above. Therefore, each of the arithmetic processing units 11 to 14 selects one update candidate bit, and transmits and receives information of the update candidate bit using the dedicated bus.

The first-stage arithmetic processing unit 11 includes a state updating unit 11a, a determination unit 11b, a selection unit 11c, and a counting unit 11d. The second-stage arithmetic processing unit 12 includes a state updating unit 12a, a determination unit 12b, a selection unit 12c, a counting unit 12d, and a selection unit 12e. Similarly to the second-stage arithmetic processing unit 12, the third-stage arithmetic processing unit 13 also includes a state updating unit 13a, a determination unit 13b, a selection unit 13c, a counting unit 13d, and a selection unit 13e. Similarly to the second- and third-stage arithmetic processing units 12 and 13, the fourth-stage arithmetic processing unit 14 also includes a state updating unit 14a, a determination unit 14b, a selection unit 14c, a counting unit 14d, and a selection unit 14e.

The state updating units 11a to 14a update any one of values of plural bits, based on an index, which are supplied from the fourth-stage arithmetic processing unit 14 to the first-stage arithmetic processing unit 11, as described later.

Each of the state updating units 11a to 14a holds plural bits that correspond to all spins of the Ising model.

Based on the information of the Ising model, each of the determination units 11b to 14b determines whether to permit updating for each of bits, the number of which is obtained by dividing the number of plural bits corresponding to all spins of the Ising model by 4 which is the number of stages of arithmetic processing units 11 to 14. The information of the Ising model includes the weighting factor described above.

For example, when the number of plural bits corresponding to all spins is 4,096, the determination unit 11b determines whether to permit updating for each of bits with indexes 0 to 1023. The determination unit 12b determines whether to permit updating for each of bits with indexes 1024 to 2047, and the determination unit 13b determines whether to permit updating for each of bits with indexes 2048 to 3071. The determination unit 14b determines whether to permit updating for each of bits with indexes 3072 to 4095. Each of the determination units 11b to 14b outputs the determination result (hereinafter referred to as a flag) as to whether to permit updating of each of the 1,024 bits, together with an index. In the following, the flag "1" indicates that updating for the corresponding bit is permitted, and the flag "0" indicates that updating for the bit is not permitted.

For example, each of the determination units 11b to 14b determines whether to permit updating of each bit, as follows. Each of the determination units 11b to 14b includes a storage (e.g., a register, a static random access memory (SRAM) or the like) that holds a weighting factor group related to the 1,024 bits to be processed by the own arithmetic processing unit. For example, the storage of the determination unit 11b holds a weighting factor group that indicates the magnitude of interaction between each of the bits with the indexes 0 to 1023 and all the other bits. Then, each of the determination units 11b to 14b calculates the energy change of the Ising model due to the change in value of each of the 1,024 bits, based on the weighting factor group and information of the bit whose value is updated (index and updated value). Then, each of the determination units 11b to 14b determines whether to permit updating of each of the 1,024 bits, based on the magnitude relationship between the calculated energy change and a thermal excitation energy (thermal noise). The thermal excitation energy is determined from a random number and a temperature parameter supplied from a controller (not illustrated). In a case where a simulated annealing is performed, the temperature parameter is controlled by the controller, for example, such that a value of the temperature parameter becomes smaller each time the process of updating the state of the Ising model is repeated a predetermined number of times. In addition, an example of a circuit that performs the above-described determination process will be described later.

Each of the selection units 11c to 14c selects one update candidate bit from the bits permitted to be updated (hereinafter, referred to as update permission bits) based on the flag described above, and outputs an index of the selected update candidate bit. For example, when there are plural update permission bits having a flag of 1 among the bits of indexes 0 to 1023, the selection unit 11c selects one update candidate bit from the corresponding plural update permission bits using a random number, and outputs an index of the selected update candidate bit. In addition, one update candidate bit is selected even when all of the flags of the bits with the indexes 0 to 1023 are 0.

Each of the selection units 11c to 14c outputs the flag of the update candidate bit as well, in addition to the index of the update candidate bit.

Each of the counting units 11d to 14d counts the number of update permission bits in the own arithmetic processing unit. For example, the counting unit 11d counts the number of update permission bits with the flag of 1 among the bits of the indexes 0 to 1023.

Each of the selection units 12e to 14e selects one of an index of an update candidate bit output from the selection unit (one of the selection units 12c to 14c) of the own arithmetic processing unit, and an index of an update candidate bit supplied from the previous-stage arithmetic processing unit, as follows.

Each of the selection units 12e to 14e receives the counting result of the number of update permission bits counted in the own arithmetic processing unit and an integrated value of the number of update permission bits counted in the arithmetic processing units up to the previous stage. Then, each of the selection units 12e to 14e selects an index output from the selection unit of the own arithmetic processing unit, with a probability obtained by dividing the counting result by the sum of the integrated value and the counting result. Each of the selection units 12e to 13e supplies the selected index to the arithmetic processing unit at the subsequent stage. Further, each of the selection units 12e to 13e updates the integrated value by adding the counting result to the integrated value supplied from the arithmetic processing unit at the previous stage, and supplies the updated integrated value to the arithmetic processing unit at the subsequent stage. The selection unit 14e that belongs to the last-stage arithmetic processing unit 14 supplies the selected index to the first-stage arithmetic processing unit 11. In addition, the flag of an update candidate bit identified by the selected index is also supplied to the arithmetic processing unit at the subsequent stage or at the first stage, along with the index.

As illustrated in FIG. 1, for example, the selection unit 12e includes a data selection circuit 12e1. The data selection circuit 12e1 selects the index of the update candidate bit output from the selection unit 12c of the arithmetic processing unit 12 when a selection signal sel1 is 1, and selects the index of the update candidate bit supplied from the arithmetic processing unit 11 when the selection signal sel1 is 0. The selection signal sel1 is generated to be 1 at the probability described above. The selection unit 12e includes a selection signal generation circuit that generates the selection signal sel1 but is not illustrated in FIG. 1. The selection unit 13e also includes a data selection circuit 13e1 which performs the same operation as the data selection circuit 12e1. The selection unit 14e also includes a data selection circuit 14e1 which performs the same operation as the data selection circuit 12e1.

Hereinafter, an example of an operation of the optimization device 10 according to the first embodiment will be described.

After an initial value of each bit is set in the state updating units 11a to 14a by a controller (not illustrated) and a weighting factor group is set in the determination units 11b to 14b, for example, each of the determination units 11b to 14b determines whether to permit updating for each bit according to the above-described process. Then, each of the determination units 11b to 14b outputs a flag that is the determination result. Each of the selection units 11c to 14c selects one update candidate bit from the update permission bits based on the flag, and outputs an index of the selected update candidate bit.

In the example of FIG. 1, the selection unit 11c of the arithmetic processing unit 11 outputs an index=1020, and the selection unit 12c of the arithmetic processing unit 12 outputs an index=2046. The selection unit 13c of the arithmetic processing unit 13 outputs an index=2054, and the selection unit 14c of the arithmetic processing unit 14 outputs an index=3078. Further, each of the selection units 11c to 14c further outputs 1 as a flag of the selected update candidate bit.

Each of the counting units 11d to 14d counts the number of update permission bits in the own arithmetic processing unit. In the example of FIG. 1, the counting unit 11d outputs 790 as the number of update permission bits, the counting unit 12d outputs 30 as the number of update permission bits, the counting unit 13d outputs 200 as the number of update permission bits, and the counting unit 14d outputs 1 as the number of update permission bits.

The first-stage arithmetic processing unit 11 supplies the index and the flag of the selected update candidate bit and the number of update permission bits to the second-stage arithmetic processing unit 12.

The selection unit 12e of the second-stage arithmetic processing unit 12 selects one of the index output from the selection unit 12c and the index supplied from the arithmetic processing unit 11, as follows. The selection unit 12e receives the counting result of the number of update permission bits counted in the arithmetic processing unit 12 and an integrated value of the number of update permission bits counted in the arithmetic processing units up to the previous stage (the number of update permission bits supplied from the arithmetic processing unit 11). Then, the selection unit 12e selects the index output by the selection unit 12c at a probability obtained by dividing the counting result by the sum of the number of update permission bits supplied from the arithmetic processing unit 11 and the counting result. The selection unit 12e supplies the selected index and flag, and an integrated value obtained by adding the counting result to the number of update permission bits supplied from the arithmetic processing unit 11, to the arithmetic processing unit 13.

In the example of FIG. 1, the selection unit 12e is supplied with 790 as the number of update permission bits from the arithmetic processing unit 11, and is supplied with 30 as the number of update permission bits counted by the counting unit 12d. Therefore, the selection unit 12e selects the index (2046 in the example of FIG. 1) output by the selection unit 12c, with the selection signal sel1 set to 1, at a probability of 30/820. In the selection unit 12e of the example of FIG. 1, the probability of selection of the index (1020 in the example of FIG. 1) supplied from the arithmetic processing unit 11 is higher than that of selection of the index output from the selection unit 12c.

The selection unit 13e of the third-stage arithmetic processing unit 13 selects one of the index output from the selection unit 13c and the index supplied from the arithmetic processing unit 12, as follows. The selection unit 13e receives the counting result of the number of update permission bits counted in the arithmetic processing unit 13 and an integrated value of the number of update permission bits counted in the arithmetic processing units up to the previous stage (the sum of the number of update permission bits in the arithmetic processing units 11 and 12). Then, the selection unit 13e selects the index output by the selection unit 13c at a probability obtained by dividing the counting result by the sum of the integrated value supplied from the arithmetic processing unit 12 and the counting result. The selection unit 13e supplies the selected index and flag, and the integrated value supplied from the arithmetic processing unit 11 and updated by adding the counting result to the integrated value, to the arithmetic processing unit 14.

In the example of FIG. 1, the selection unit 13e is supplied with a value of 820 as the integrated value of the number of update permission bits from the arithmetic processing unit 12 and is supplied with a value of 200 as the number of update permission bits counted by the counting unit 13d. Therefore, the selection unit 13e selects the index (2054 in the example of FIG. 1) output by the selection unit 13c, with the selection signal sel2 set to 1, at a probability of 200/1020. In the selection unit 13e of the example of FIG. 1, the probability of selection of the index supplied from the arithmetic processing unit 12 is higher than that of selection of the index output from the selection unit 13c.

The selection unit 14e of the fourth-stage arithmetic processing unit 14 selects one of the index output from the selection unit 14c and the index supplied from the arithmetic processing unit 13, as follows. The selection unit 14e receives the counting result of the number of update permission bits counted in the arithmetic processing unit 14 and an integrated value of the number of update permission bits counted in the arithmetic processing units up to the previous stage (an integrated value of the number of update permission bits in the arithmetic processing units 11, 12, and 13). Then, the selection unit 14e selects the index output by the selection unit 14c at a probability obtained by dividing the counting result by the sum of the integrated value supplied from the arithmetic processing unit 13 and the counting result. The selection unit 14e supplies the selected index and flag to the first-stage arithmetic processing unit 11.

In the example of FIG. 1, the selection unit 14e is supplied with a value of 1020 as the integrated value of the number of update permission bits from the arithmetic processing unit 13 and is supplied with a number of 1 as the number of update permission bits counted by the counting unit 14d. Therefore, the selection unit 14e selects the index (3078 in the example of FIG. 1) output by the selection unit 14c, with the selection signal sel3 set to 1, at a probability of 1/1021. In the selection unit 14e of the example of FIG. 1, the probability of selection of the index supplied from the arithmetic processing unit 13 is higher than that of selection of the index output from the selection unit 14c. Further, FIG. 1 illustrates an example in which a value of 1020 that is the index of the update candidate bit selected in the arithmetic processing unit 11 is selected in the selector 12e of the arithmetic processing unit 12, the selector 13e of the arithmetic processing unit 13, and the selection unit 14e of the arithmetic processing unit 14, and is supplied to the arithmetic processing unit 11. In this case, the update candidate bit having the index of 1020 becomes an update target bit.

When the flag supplied from the arithmetic processing unit 14 is 1, the state updating unit 11a of the arithmetic processing unit 11 updates (inverts) the value of a bit corresponding to the index supplied from the arithmetic processing unit 14 among the plural bit values that are being held.

The index and flag supplied from the arithmetic processing unit 14 to the arithmetic processing unit 11 are supplied from the state updating unit 11a to the arithmetic processing unit 12, also supplied from the arithmetic processing unit 12 to the arithmetic processing unit 13, and supplied from the arithmetic processing unit 13 to the arithmetic processing unit 14. Then, the same process as in the state updating unit 11a is performed in the state updating units 12a, 13a, and 14a.

The process as described above is repeated a predetermined number of times under control of a controller (not illustrated). For example, after the process is repeated a predetermined number of times, the value of each bit held in the state updating units 11a to 14a is output as a solution. The arithmetic processing units 11 to 14 may supply not only the index and flag of the selected update candidate bit but also the energy change (the determination units 11b to 14b) corresponding to the update candidate bit to the arithmetic processing unit at the subsequent stage (the first-stage for the arithmetic processing unit 14). Then, the state updating units 11a to 14a may update the energy of the Ising model based on the energy change supplied from the arithmetic processing unit 14 to the arithmetic processing unit 11. Further, the state updating units 11a to 14a may hold the updated energy as the minimum energy when the updated energy is smaller than the values that have been obtained, and may hold the value of each bit (Ising model state) at that time. In that case, the value of each bit when the minimum energy held is obtained by repeating the process of updating the state of the Ising model a predetermined number of times is output as a solution.

Hereinafter, prior to describing the effects of the optimization device 10 of the first embodiment, a comparative example for the optimization device 10 will be described.

Figure 2:
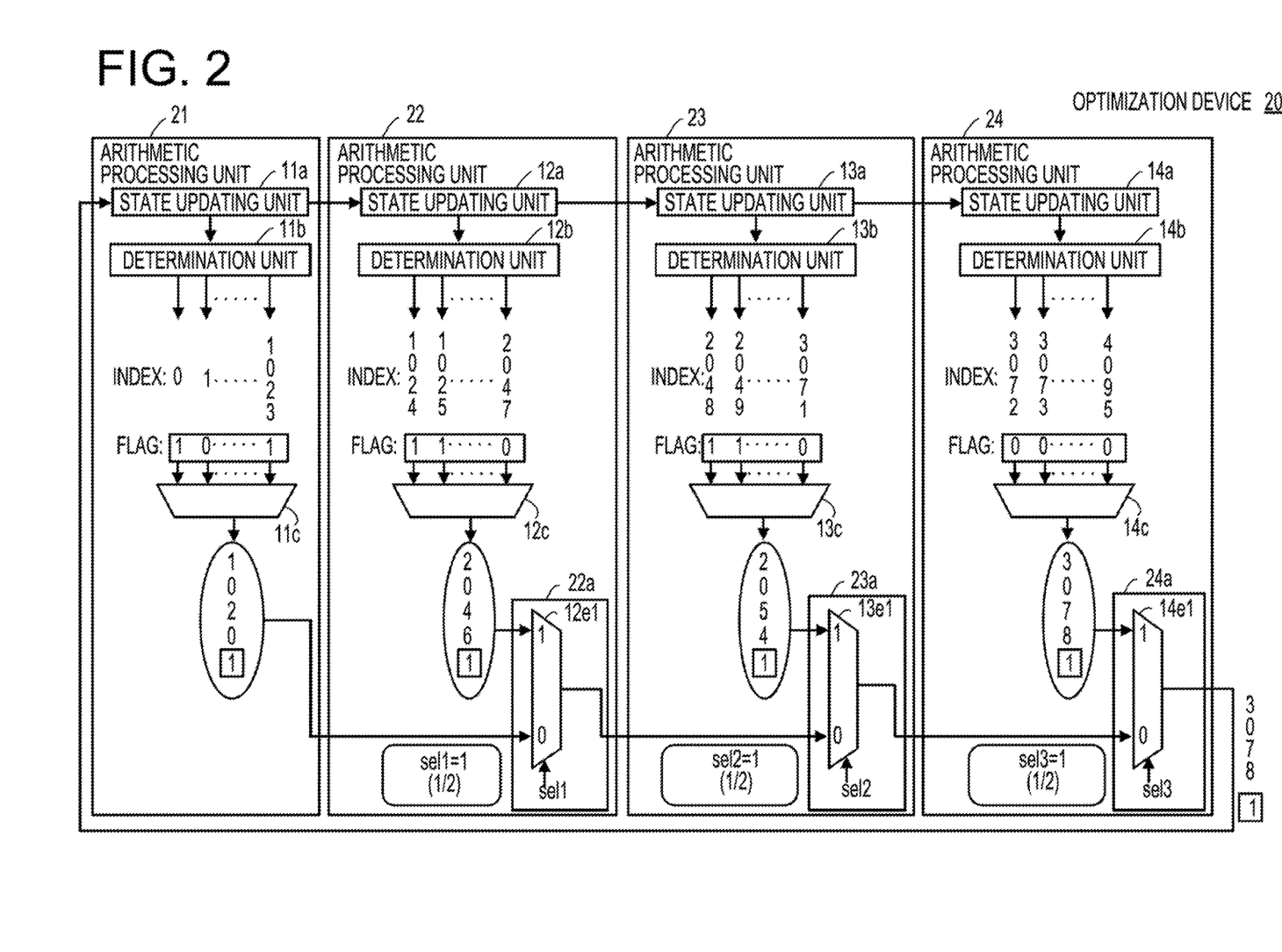
FIG. 2 is a view illustrating an optimization device according to a comparative example of the optimization device of the first embodiment.

FIG. 2 is a view illustrating an optimization device of a comparative example for the optimization device of the first embodiment. In FIG. 2, the same components as those of the optimizing device 10 illustrated in FIG. 1 will be denoted by the same reference numerals as used in FIG. 1.

In an optimization device 20 of the comparative example, among arithmetic processing units 21, 22, 23, and 24, each of selection units 22a, 23a, and 24a included in the arithmetic processing units 22 to 24 selects an index output by the selection unit (one of the selection units 12c to 14c) of the own arithmetic processing unit at a probability of 1/2. That is, each of the selection signal sel1 supplied to the data selection circuit 12e1 of the selection unit 22a, the selection signal sel2 supplied to the data selection circuit 13e1 of the selection unit 23a, and the selection signal sel3 supplied to the data selection circuit 14e1 of the selection unit 24a becomes 1 at the probability of 1/2.

Thus, the index of an update candidate bit selected in a relatively later-stage arithmetic processing unit is prioritized, a bias occurs in the selection probability of an update target bit, and an update target bit may not be appropriately selected. For example, in the example of FIG. 2, the probability of selection of bits with indexes 3072 to 4095 as update target bits is higher than that of selection of the other bits. The bias in the selection probability may deteriorate the calculation accuracy of a solution.

Meanwhile, in the optimization device 10 of the first embodiment, since each of the arithmetic processing units 22 to 24 uses an integrated value of update permission bits sent from the arithmetic processing unit at the previous stage, to select an update candidate bit at the probability described above, it is possible to eliminate the bias in the selection probability of the update target bit.

Hereinafter, an example of calculation of the selection probability will be described using the example of FIG. 1. In addition, when there are plural bits of a flag "1" among the 1,024 bits, it is assumed that each of the selection units 11c to 14c selects one of the multiple bits with the flag "1" at an equal probability.

For example, in the example of FIG. 1, the probability that the selection unit 14e of the fourth-stage arithmetic processing unit 14 is to output any one of 0 to 1023 as an index is (1/790)×(790/820)×(820/1020)×(1020/1021)=1/1,021. The probability that the selecting unit 14e is to output any one of 1024 to 2047 as an index is (1/30)×(30/820)×(820/1020)×(1020/1021)=1/1021. The probability that the selecting unit 14e is to output any one of 2048 to 3071 as an index is (1/200)×(200/1020)×(1020/1021)=1/1021. The probability that the selecting unit 14e is to output any one of 3072 to 4095 as an index is 1×(1/1021)=1/1021.

That is, in the above-described example, since the probability that each update permission bit becomes an update target bit may be set to 1/1021, an update target bit may be selected at an equal probability from all the update permission bits.

As described above, in the optimization device 10 of the first embodiment, it is possible to achieve a large scale device using a plurality of arithmetic processing units connected in a ring shape, without causing a bias in the selection probability of an update target bit.

Further, the arithmetic processing units 11 to 14 are connected in a ring shape, each of the arithmetic processing units 11 to 14 selects one update candidate bit (or update target bit), and the information of the update candidate bit is exchanged between the arithmetic processing units. Therefore, it is possible to increase the number of arithmetic processing units without increasing the number of interfaces and the amount of data transfer on a bus between the arithmetic processing units 11 to 14.

Second Embodiment

Figure 3:
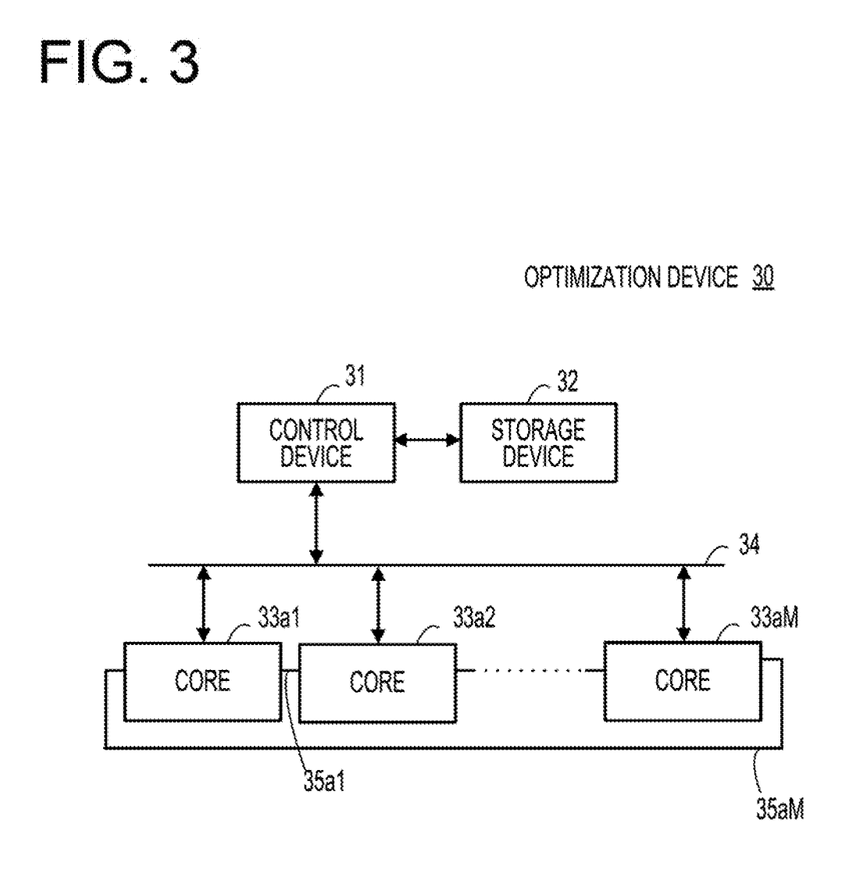
FIG. 3 is a view illustrating an example of an optimization device according to a second embodiment.

FIG. 3 is a view illustrating an example of an optimization device according to a second embodiment.

The optimization device 30 according to the second embodiment includes a control device 31, a storage device 32, M-stage cores 33a1, 33a2, . . . , and 33aM, a shared bus 34, and dedicated buses 35a1, 35a2, . . . , and 35aM.

The control device 31 controls the cores 33a1 to 33aM. The control device 31 is a processor including an arithmetic circuit that executes instructions of a program, such as a central processing unit (CPU) or a digital signal processor (DSP). The control device 31 executes a program stored in the storage device 32. The control device 31 may include a plurality of processors or a plurality of processor cores, and may execute the control of the cores 33a1 to 33aM in parallel using a plurality of processors or processor cores.

The storage device 32 stores information, etc. of the Ising model. The storage device 32 may store a program to be executed by the control device 31. The storage device 32 is, for example, a volatile storage device such as a synchronous dynamic random access memory (SDRAM), a nonvolatile storage device such as a flash memory, an electrically erasable programmable read only memory (EEPROM) or a hard disk drive (HDD), or a combination thereof.

Each of the cores 33a1 to 33aM has the same function as that of any one of the arithmetic processing units 11 to 14 of the optimization device 10 of the first embodiment. Each of the cores 33a1 to 33aM is, for example, a single-chip semiconductor integrated circuit. An example of the internal configuration of the cores 33a1 to 33aM will be described later.

The shared bus 34 connects the cores 33a1 to 33aM and the control device 31 to each other. The shared bus 34 is used for a communication of control signals that cause the control device 31 to control the cores 33a1 to 33aM, information of the Ising model, search results by the cores 33a1 to 33aM, and the like. As for the shared bus 34, for example, PCI (Peripheral Component Interconnect)-Express or the like is used.

The dedicated buses 35a1 to 35aM connect the cores 33a1 to 33aM to each other in a ring shape. For example, the dedicated bus 35a1 connects the output terminal of the core 33a1 to the input terminal of the core 33a2, and the dedicated bus 35aM connects the output terminal of the core 33aM to the input terminal of the core 33a1. The dedicated buses 35a1 to 35aM are used to exchange information such as indexes and flags of update candidate bits among the cores 33a1 to 33aM. The dedicated buses 35a1 to 35aM are, for example, metal cables or optical cables. As an optical cable, for example, a quad small form-factor pluggable (QSFP) cable having a communication speed of 100 Gbps may be used. Since the cores 33a1 to 33aM are connected to each other in the point-to-point manner by the dedicated buses 35a1 to 35aM, a high data transfer bandwidth may be secured.

Figure 4:
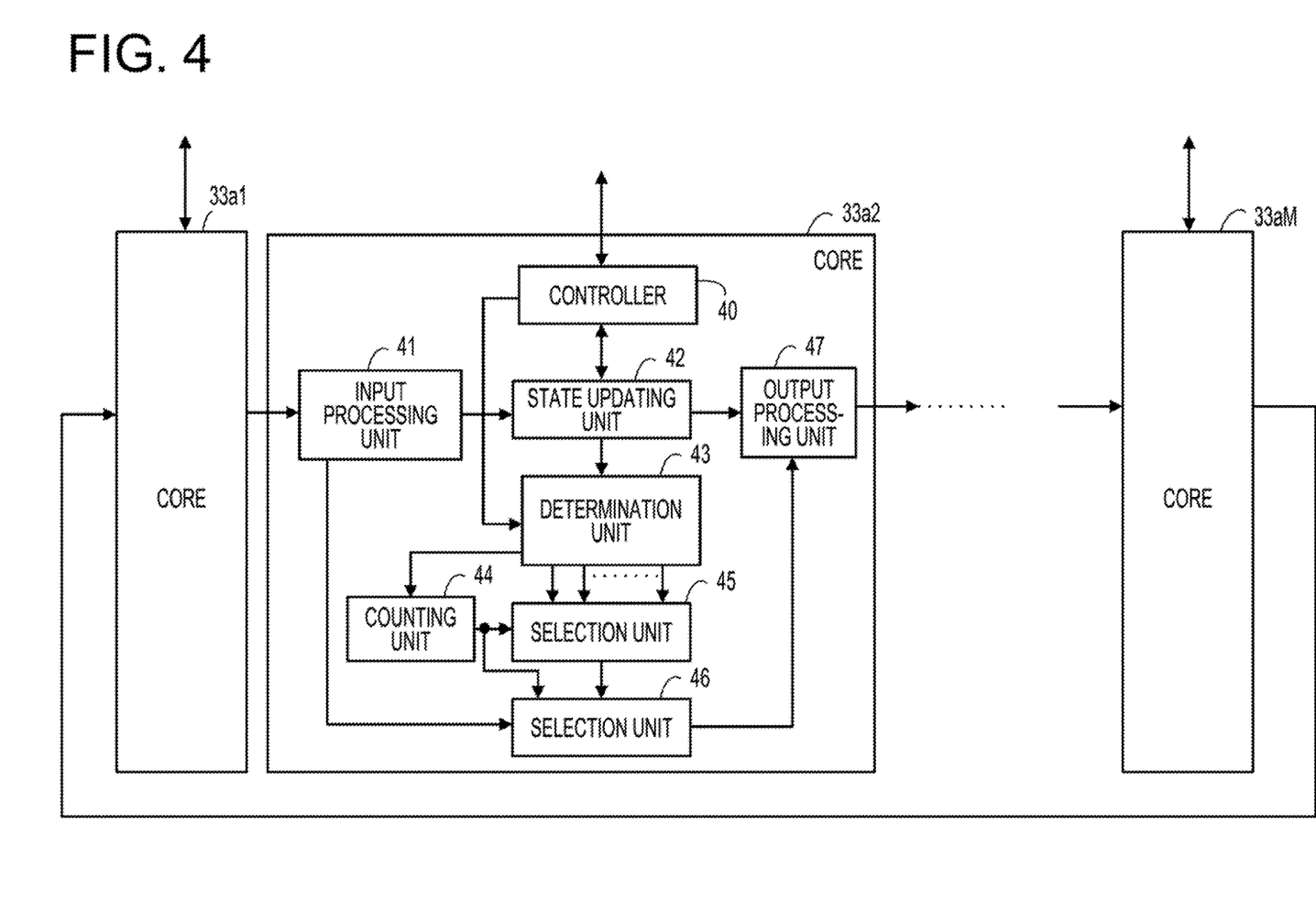
FIG. 4 is a view illustrating an example of an internal configuration of a core.

FIG. 4 is a view illustrating an example of the internal configuration of a core. FIG. 4 illustrates an example of the internal configuration of the core 33a2, and the other cores have the same internal configuration as the internal configuration of the core 33a2.

The core 33a2 includes a controller 40, an input processing unit 41, a state updating unit 42, a determination unit 43, a counting unit 44, selection units 45 and 46, and an output processing unit 47.

The controller 40 receives various types of information from the control device 31 before the process of updating the state of the Ising model is started. The information received by the controller 40 from the control device 31 includes, for example, information of the Ising model, an initial value of each bit, an incremental value of an offset value to be described later, temperature schedule information for performing a simulated annealing, and the number of repetitions of the updating process. Further, the information received by the controller 40 from the control device 31 includes the number of cores (=M) and a value m, which are information for determining the core type (information for determining the stage number of the core 33a2). For example, the core 33a1 is represented by m=0, and the core 33aM is represented by m=M−1. The information m=1 and M is transmitted from the control device 31 to the controller 40 included in the core 33a2.

Then, the controller 40 sets the information of the Ising model in the determination unit 43, sets the temperature parameter based on the temperature schedule information in the determination unit 43, and causes the state updating unit 42 to hold the initial value of each bit. Further, the controller 40 sets the initial value (=0) of the offset value and the incremental value of the offset value in the state updating unit 42.

Then, for example, the controller 40 supplies a clock signal to each unit of the core 33a2, and starts the process of updating the state of the Ising model. Further, the controller 40 counts the number of times of the updating process, and reduces the value of the temperature parameter set in the determination unit 43 based on the temperature schedule information each time the number of times of the updating process reaches a predetermined number. Further, when the number of times of the updating process reaches the number of repetitions received from the control device 31, the controller 40 transmits a notification of completion of the updating process to the control device 31.

In addition, when a request for an output of a search result is received from the control device 31, the controller 40 acquires from the state updating unit 42 the minimum energy when the number of times of the updating process reaches the number of repetitions, and the value of each bit at that time, and transmits the acquired information to the control device 31. Further, the controller 40 may acquire from the state updating unit 42 the energy when the number of times of the updating process reaches the number of repetitions, and the value of each bit at that time, and transmit the acquired information to the control device 31.

Further, before the process of updating the state of the Ising model is started, the controller 40 may receive from the control device 31 the energy obtained when the previous updating process of the repetition time is completed and each bit value, and receive the minimum energy and each bit value when the minimum energy is obtained. Then, the controller 40 may set the received energy, value of each bit, minimum energy, and value of each bit when the minimum energy is obtained, in the state updating unit 42, and then, may start the current updating process.

The controller 40 may be implemented, for example, by an electronic circuit of a specific application such as an ASIC or an FPGA. The control unit 40 may be a processor such as a CPU or a DSP. In that case, the processor performs the above-described process of the controller 40 by executing a program stored in a memory.

The input processing unit 41 receives update target bit information and update candidate bit information from the core 33a1 at the previous stage. Then, the input processing unit 41 supplies the received update target bit information to the state updating unit 42, and supplies the received update candidate bit information to the selection unit 46.

The update target bit information includes an index of an update target bit, a flag, and an energy change when the value of the update target bit is inverted. The update candidate bit information includes an integrated value of the number of update permission bits in the cores up to the previous stage, in addition to the index of the update target bit, the flag, and the energy change when the value of the update target bit is inverted. The integrated value of the update candidate bit information received by the input processing unit 41 corresponds to the number of update permission bits in the core 33a1.

Although not illustrated, the input processing unit included in the first-stage core 33a1 is supplied with not the update candidate bit information but the update target bit information from the core 33aM.

The state updating unit 42 holds the current value of each bit, the current energy, the minimum energy, the value of each bit when the minimum energy is obtained, the current offset value, and the incremental value of the offset value. Then, based on the update target bit information supplied from the input processing unit 41, the state updating unit 42 updates the current value of each bit and the current energy. In addition, when the updated current energy is smaller than the minimum energy, the state updating unit 42 updates the minimum energy and the value of each bit when the minimum energy is obtained. Further, when the flag included in the update target bit information is 0, the state updating unit 42 adds an incremental value to the current offset value, and supplies the addition result to the determination unit 43. Further, the state updating unit 42 supplies the update target bit information to the output processing unit 47.

The determination unit 43 determines whether to permit updating for each of the number of bits obtained by dividing the number of plural bits corresponding to all spins of the Ising model by M which is the number of stages of cores 33a1 to 33aM, based on the information of the Ising model, and outputs a flag indicating the determination result. For example, when M=4 and the total number of bits is 4,096, the determination unit 43 included in the second-stage core 33a2 determines whether to permit updating for bits of indexes 1024 to 2047. A circuit example of the determination unit 43 will be described later.

The counting unit 44 counts the number of update permission bits determined by the determination unit 43.

The selection unit 45 selects one update candidate bit from among the update permission bits using a random number based on the flag and the number of update permission bits, and outputs an index and a flag of the selected update candidate bit. A circuit example of the selection unit 45 will be described later.

The selection unit 46 updates the integrated value based on the update candidate bit information supplied from the input processing unit 41 and the counting result of the number of update permission bits counted in the own core 33a2. Assuming that the integrated value included in the update candidate bit information is C[m−1] and the counting result output from the counting unit 44 is U[m], the updated integrated value C[m] may be expressed as C[m]=C[m−1]+U[m]. Then, the selection unit 46 selects the index to be output by the selection unit 45 at a probability of U[m]/C[m]. Further, the selection unit 46 selects the index of the update candidate bit included in the update candidate bit information at a probability of 1−U[m]/C[m].

The selection unit 46 supplies, to the output processing unit 47, update candidate bit information including the selected index, the flag corresponding thereto, and the updated integrated value. A circuit example of the selection unit 46 will be described later.

Although not illustrated, the first-stage core 33a1 may also have a selection unit corresponding to the selection unit 46, but the selection unit selects the index of the updated candidate bit selected in the core 33a1, at a probability of 1/1.

The output processing unit 47 transmits the update target bit information supplied from the state updating unit 42 to a core (not illustrated) at the subsequent stage, and then, transmits the update candidate bit information supplied from the selection unit 46 to the core at the subsequent stage.

Although not illustrated, the output processing unit included in the M-th-stage core 33aM transmits, to the first-stage core 33a1, information excluding the integrated value among the update candidate bit information output from the selection unit corresponding to the selection unit 46 in the core 33aM, as new update target bit information.

Circuit Example of Determination Unit 43

Figure 5:
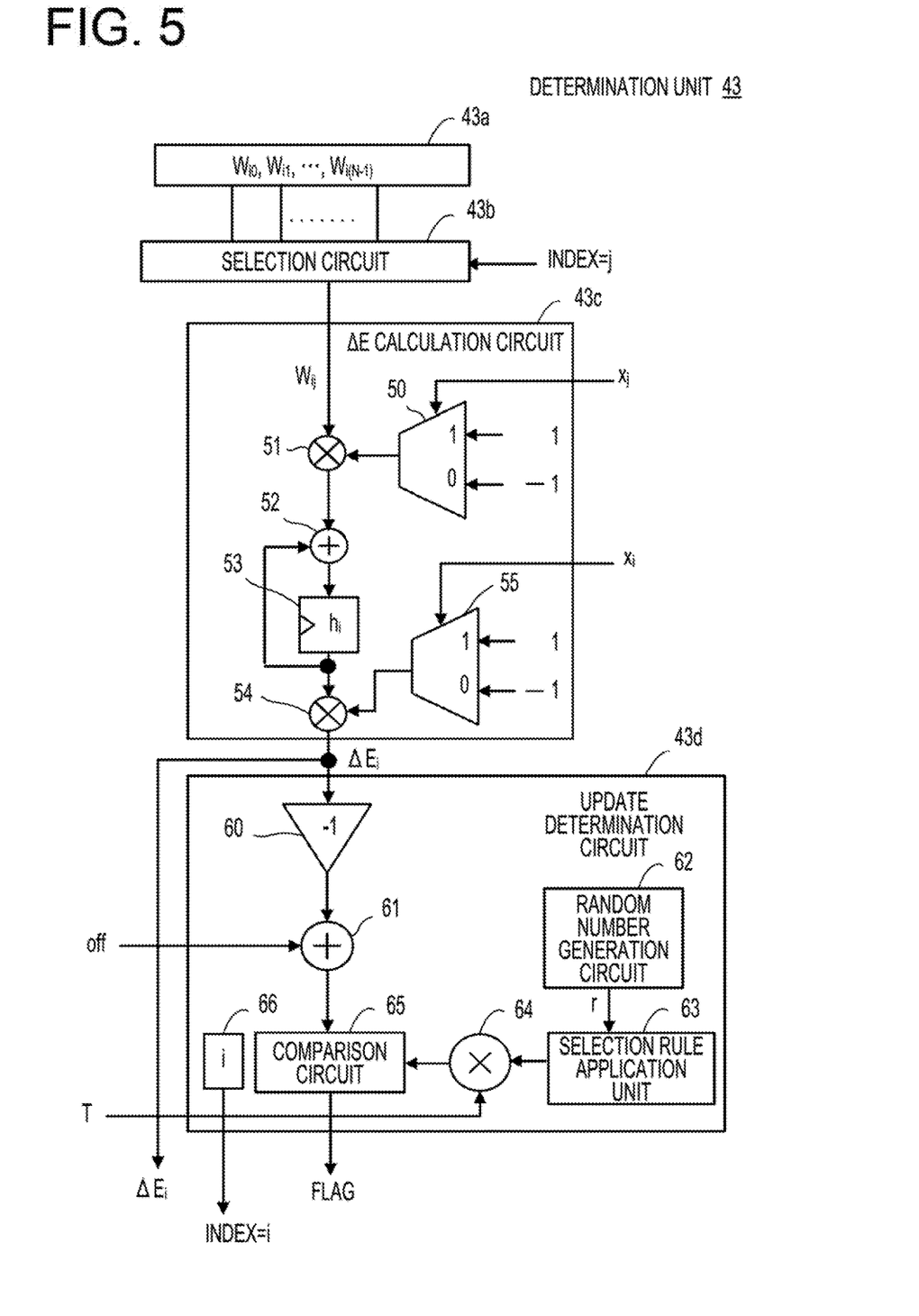
FIG. 5 is a view illustrating an example of a circuit of a determination unit.

FIG. 5 is a view illustrating a circuit example of a determination unit. FIG. 5 illustrates a circuit unit that determines whether to permit updating for a bit of index=i in the determination unit 43. Similar circuit units are provided for the other bits. When M=4 and the total bit number N is 4,096, "i" is one value of 1024 to 2047 in the determination unit 43 included in the second-stage core 33a2.

The determination unit 43 includes a register 43a, a selection circuit 43b, a ΔE calculation circuit 43c, and an update determination circuit 43d.

The register 43a holds weighting factors $W_{i0}$, $W_{i1}$, . . . , and $W_{i(N-1)}$ representing the magnitude of interaction between the bit of index=i and the bits of index=0 to N−1.

The selection circuit 43b receives the index=j (any value of 0 to N−1) of the update target bit from the state updating unit 42, and selects and outputs a weighting factor $W_{ij}$ representing the magnitude of interaction between the update target bit and the bit of index=i from the weighting factors $W_{i0}$ to $W_{i(N-1)}$.

The ΔE calculation circuit 43c includes a selection circuit 50, a multiplier 51, an adder 52, a register 53, a multiplier 54, and a selection circuit 55.

The selection circuit 50 implements calculation of the change amount of the value of the update target bit. When the value (variable $x_j$) of the bit of index=j changes from 1 to 0, the change amount $\Delta x_j$ is −1. When the variable $x_j$ changes from 0 to 1, $\Delta x_j$ is 1. The selection circuit 50 selects and outputs −1 when the updated value of the variable $x_j$ supplied from the state updating unit 42 is 0, and selects and outputs 1 when the updated value of the variable $x_j$ is 1.

The multiplier 51 outputs the product of the weighting factor output from the selection circuit 43b and the value output from the selection circuit 50. In the example of FIG. 5, the weighting factor $W_{ij}$ is input to the multiplier 51. The output of the multiplier 51 represents the change amount $\Delta h_i$ of a local field $h_i$ due to the change of the variable $x_j$.

The adder 52 adds the value output from the multiplier 51 and the value stored in the register 53, and outputs the addition result.

The register 53 takes in the value (local field $h_i$) output from the adder 52 in synchronization with a clock signal (not illustrated). The register 53 is, for example, a flip flop. The initial value of the local field $h_i$ stored in the register 53 is, for example, a bias factor $b_i$ when the initial value of all the variables x is 0.

The multiplier 54 outputs the product of the local field $h_i$ output from the register 53 and the value output from the selection circuit 55. This product is the energy change $\Delta E_i$ due to the change of the value of the bit of index=i, which is expressed as the equation (2).

The selection circuit 55 implements calculation of −$\Delta x_i$ in the equation (2). The selection circuit 55 outputs −1 when the variable $x_i$ indicating the value of the current bit of index=i supplied from the state updating unit 42 is 0, and outputs 1 when the variable $x_i$ is 1.

The update determination circuit 43d includes a sign inversion unit 60, an adder 61, a random number generation circuit 62, a selection rule application unit 63, a multiplier 64, a comparison circuit 65, and a register 66.

The sign inversion unit 60 inverts the sign by multiplying the energy change $\Delta E_i$ output from the ΔE calculation circuit 43c by −1.

The adder 61 adds an offset value off supplied from the state updating unit 42 to the output value of the sign inversion unit 60. As described above, when the flag included in the update target bit information is 0 (when bit updating does not occur), the state updating unit 42 increases the offset value off, so that bit updating is easily permitted. When the current state is in a local solution, escape from that local solution is promoted.

The random number generation circuit 62 generates a uniform random number "r" of 0 or more and 1 or less. The random number generation circuit 62 is implemented by an LFSR (Linear Feedback Shift Register), a Mersenne twister or the like.

The selection rule application unit 63 outputs a value based on a selection rule (metropolis method or Gibbs method) for performing simulated annealing.

When a simulated annealing is performed, assuming that the permission probability A(ΔE, T) of the state transition causing an energy change ΔE is defined as the following equations (3) and (4), it has been proved that the state reaches the optimal solution at the limit of the infinity of time (the number of iterations).

(Equation 3)

$$A(\Delta E, T) = f(-\Delta E/T) \quad (3)$$

(Equation 4)

$$f(-\Delta E/T) = \begin{cases} \min[1, \exp(-\Delta E/T)] & \text{Metropolis method} \\ 1/[1 + \exp(\Delta E/T)] & \text{Gibbs method} \end{cases} \quad (4)$$

In the equations (3) and (4), T is the above-mentioned temperature parameter.

When using the permission probability A(ΔE, T) represented by the equation (3), assuming that the state reaches the steady state after sufficient repetition, the occupancy probability of each state follows the Boltzmann distribution with respect to the thermal equilibrium state in thermodynamics. In addition, since the occupancy probability of a low energy state increases when the temperature is gradually lowered from the high temperature, the low energy state may be obtained when the temperature is sufficiently lowered. This method is called a simulated annealing because it is very similar to a state change when a material is annealed. At this time, the stochastic occurrence of a state transition in which energy rises corresponds to a thermal excitation in physics.

A circuit that outputs a flag (=1) indicating that a state transition causing an energy change ΔE at the permission probability A(ΔE, T) is permitted may be implemented by a comparator that outputs a value based on a result of comparison between f (−ΔE/T) in the equations (3) and (4) and the uniform random number "r."

However, the same function may be implemented even when the following modification is made. Even when the same monotonically increasing function is applied to two numbers, the magnitude relationship does not change. Therefore, the output of the comparator does not change even when the same monotonically increasing function is applied to the two inputs of the comparator. For example, the reverse function $f^{-1}(-\Delta E/T)$ of $f(-\Delta E/T)$ may be used as a monotonically increasing function acting on $f(-\Delta E/T)$, and $f^{-1}(r)$ where "r" is −ΔE/T in $f^{-1}(-\Delta E/T)$ may be used as a monotonically increasing function acting on the uniform random number "r." In that case, it may be understood that a circuit having the same function as the above-described comparator may be a circuit that outputs 1 when −ΔE/T is larger than $f^{-1}(r)$. Furthermore, since the temperature parameter T is positive, the circuit may be a circuit that outputs 1 when −ΔE is larger than $T \cdot f^{-1}(r)$.

The selection rule application unit 63 in FIG. 5 outputs the value of $f^{-1}(r)$ using a conversion table for converting the input uniform random number r into the value of $f^{-1}(r)$. When the metropolis method is applied, $f^{-1}(r)$ is log (r). The conversion table is stored, for example, in a memory such as a random access memory (RAM) or a flash memory.

The multiplier 64 outputs the product $(T \cdot f^{-1}(r))$ of the temperature parameter T supplied from the controller 40 and $f^{-1}(r)$. $T \cdot f^{-1}(r)$ corresponds to thermal excitation energy.

The comparison circuit 65 compares the addition result by the adder 61 with $T \cdot f^{-1}(r)$. When the addition result is larger than $T \cdot f^{-1}(r)$, the comparison circuit 65 outputs 1 (a value indicating that updating is permitted) as a flag. Further, when the addition result is equal to or smaller than $T \cdot f^{-1}(r)$, the comparison circuit 65 outputs 0 (a value indicating that updating is not permitted) as a flag.

The register 66 holds an index=i.

The energy change $\Delta E_i$, the index=i and the flag are supplied to the selection unit 45 of FIG. 4 as information as to whether to permit updating for the bit of index=i.

Circuit Example of Selection Unit 45

Figure 6:
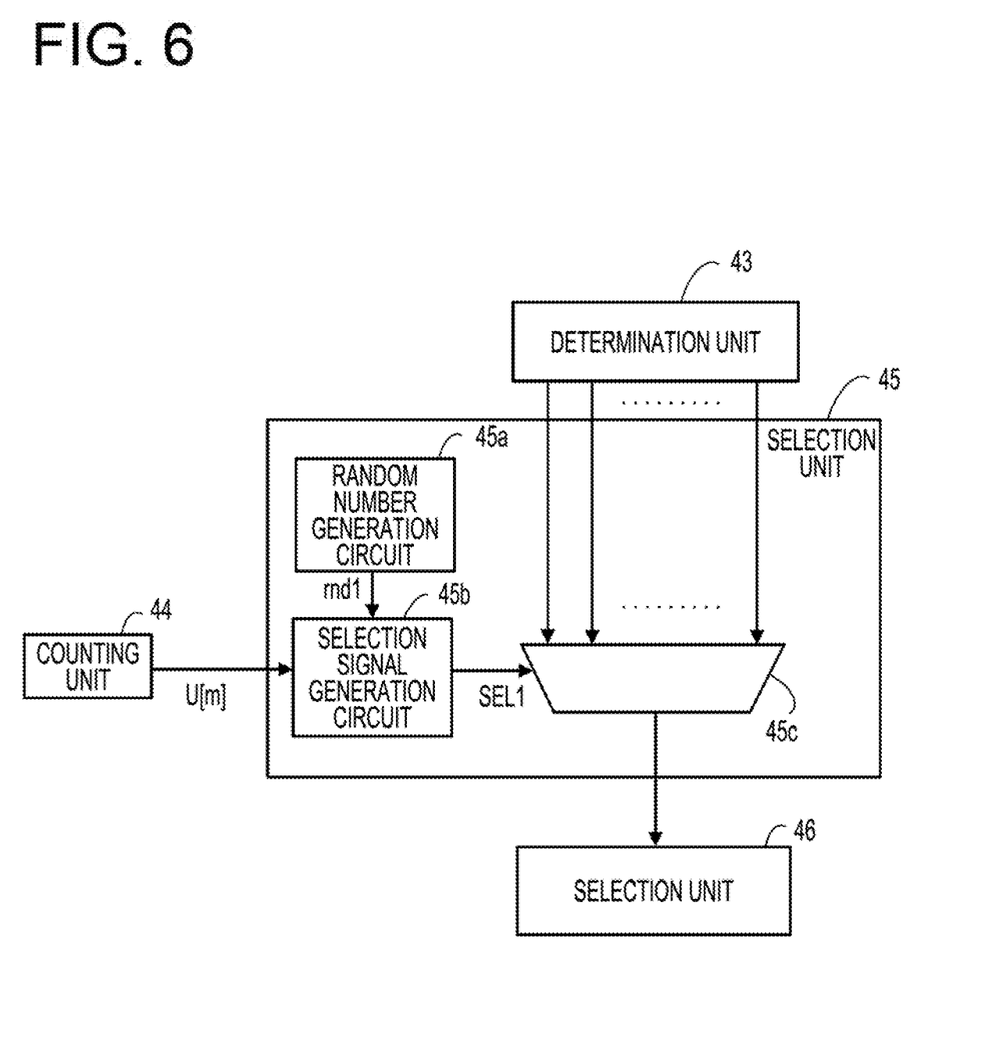
FIG. 6 is a view illustrating an example of a selection unit that selects an update candidate bit in the core.

FIG. 6 is a view illustrating an example of a selection unit that selects an update candidate bit in a core.

The selection unit 45 includes a random number generation circuit 45a, a selection signal generation circuit 45b, and a data selection circuit 45c.

The random number generation circuit 45a generates, for example, a uniform random number rnd1 of 16 bits of 0 to 65535. The random number generation circuit 45a is implemented by LFSR, Mersenne twister or the like.

The selection signal generation circuit 45b generates a selection signal SEL1 based on the update permission bit number U[m] supplied from the counting unit 44 and the uniform random number rnd1.

When the uniform random number rnd1 has a value of 0 to 65535, the selection signal generation circuit 45b outputs the value of (U[m]×rnd1)>>16 as the selection signal SEL1 when U[m]≥2. Here, ">>16" represents a 16-bit right shift, and (U[m]×rnd1)>>16 is the same as calculating U[m]×rnd1/65536 (the decimal places are truncated). When U[m] <2, the selection signal generation circuit 45b outputs 0 as the selection signal SEL1.

The data selection circuit 45c is supplied with the index of each bit, the flag, and the energy change from the determination unit 43. Then, the data selection circuit 45c selects all flags having a value of 1 (e.g., flags of the update permission bits) among the flags of the respective bits output from the determination unit 43. Thereafter, the data selection circuit 45c counts from the smaller of the indexes of the update permission bits, and outputs information (index, flag, energy change) of the update permission bit of the SEL1-th (value of the selection signal SEL1) index.

In addition, when the flags of the respective bits output from the determination unit 43 are all 0, the data selection circuit 45c outputs the index, the flag, and the energy change of the bit of the smallest index in the core 33a2.

The selection unit 45 may select one among all update permission bits in the core 33a2 at a relatively uniform ratio by performing selection based on the counting result of update permission bits and a random number.

Circuit Example of Selection Unit 46

Figure 7:
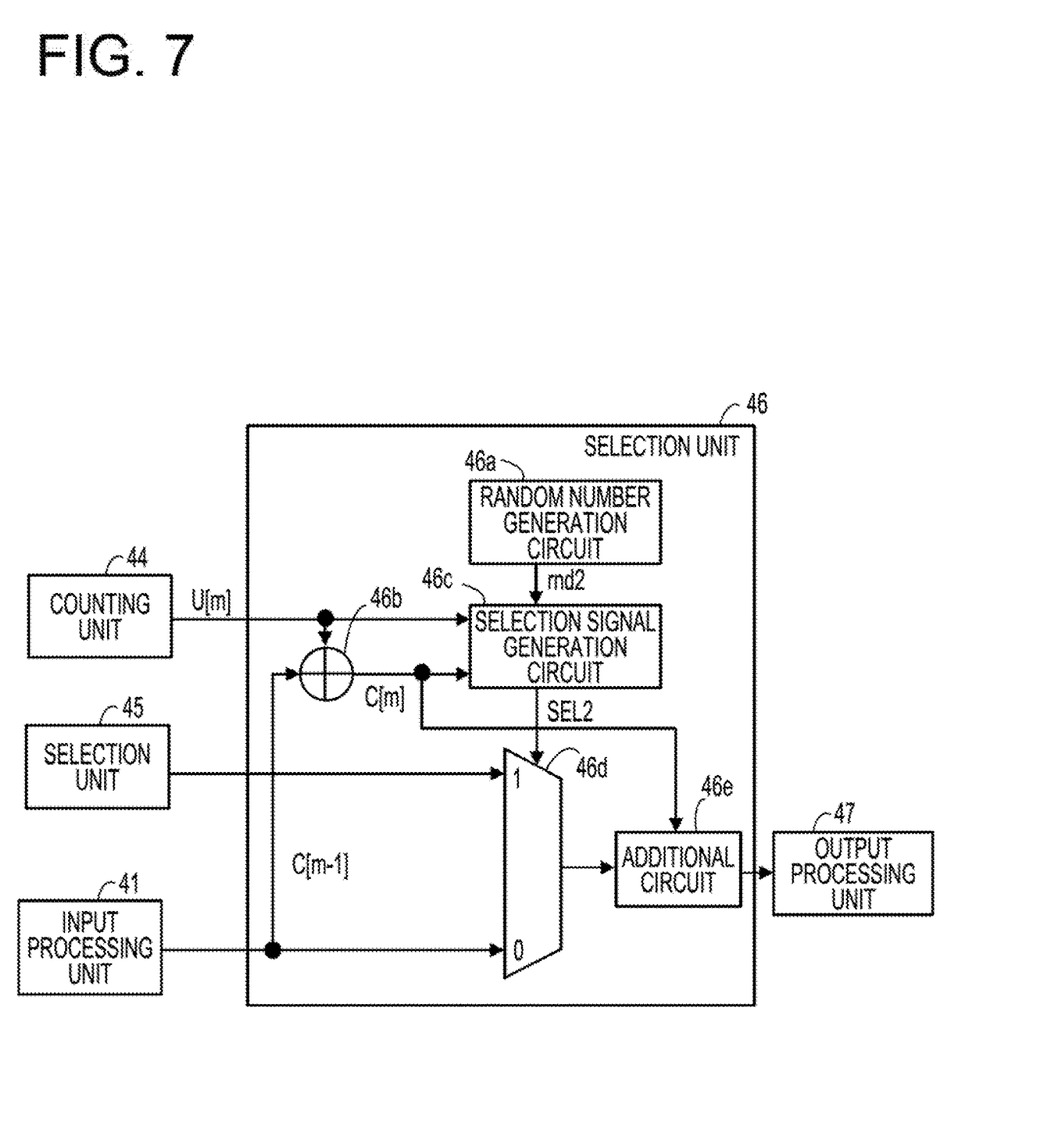
FIG. 7 is a view illustrating an example of a selection unit that selects one of indexes of an update candidate bit of an own core and an update candidate bit of a previous-stage core.

FIG. 7 is a view illustrating an example of a selection unit that selects an index of one of the update candidate bit of its own core and the update candidate bits of the previous-stage core.

The selection unit 46 includes a random number generation circuit 46a, an adder 46b, a selection signal generation circuit 46c, a data selection circuit 46d and an additional circuit 46e.

The random number generation circuit 46a generates, for example, a uniform random number rnd2 of 16 bits of 0 to 65535. The random number generation circuit 46a is implemented by LFSR, Mersenne twister or the like.

The adder 46b outputs the integrated value C[m] updated by adding the update permission bit number U[m] to the integrated value C[m−1] included in the update candidate bit information supplied from the input processing unit 41.

The selection signal generation circuit 46c generates a selection signal SEL2 based on the update permission bit number U[m], the integrated value C[m] and the uniform random number rnd2.

When the uniform random number rnd2 is a value of 0 to 65535, the selection signal generation circuit 46c outputs 1 as the selection signal SEL2 if rnd2<65536×U[m]/C[m] when C[m] is larger than 0. The selection signal generation circuit 46c outputs 0 as the selection signal SEL2 when rnd2<65536×U[m]/C[m] is not satisfied.

Further, when C[m]=0, the selection signal generation circuit 46c outputs 1 as the selection signal SEL2.

When the selection signal SEL2 is 1, the data selection circuit 46d selects and outputs the information output from the selection unit 45. When the selection signal SL2 is 0, the data selection circuit 46d selects and outputs one excluding the integrated value C[m−1] among the update candidate bit information supplied from the input processing unit 41.

The additional circuit 46e outputs update candidate bit information obtained by adding the integrated value C[m] to the information output from the data selection circuit 46d.

Hereinafter, an operation example of the optimization device 30 will be described.

First, the control device 31 illustrated in FIG. 3 activates the cores 33a1 to 33aM via the shared bus 34, and transmits various types of information such as information on the Ising model to the cores 33a1 to 33aM.

The cores 33a1 to 33aM receive various types of information from the control device 31, and determine whether to permit updating for each bit by the above-described process, based on the received various types of information. For example, when M=4 and the total number of bits is 4,096, the determination unit 43 included in the second-stage core 33a2 determines whether to permit updating for bits of indexes 1024 to 2047.

After that, the cores 33a1 to 33aM select one update candidate bit from among update permission bits using a random number based on a flag indicating the determination result of whether to permit updating, and the number of update permission bits.

The first-stage core 33a1 transmits the update candidate bit information including the index, the flag and the energy change of the selected update candidate bit, and the number of update permission bits to the core 33a2 via the dedicated bus 35a1. The cores 33a2 to 33aM at the second and subsequent stages update the integrated value C[m] of the number of update permission bits based on the update candidate bit information transmitted by the previous-stage core and the update permission bit number U[m] counted in its own core. Then, the cores 33a2 to 33aM select the index of the update candidate bit selected in their own cores, at a probability of U[m]/C[m], and then select the index of the update candidate bit included in the update candidate bit information at a probability of 1−U[m]/C[m].

Then, the cores 33a2 to 33aM except for the core 33aM transmit the update candidate bit information including the index, the flag, the energy change and the updated integrated value of the selected update candidate bit to the subsequent-stage core. The core 33aM transmits the update target bit information including the index, the flag and the energy change of the selected update candidate bit to the first-stage core 33a1.

The core 33a1 updates the current value of each bit and the current energy based on the update target bit information. When the updated current energy is smaller than the minimum energy, the core 33a1 updates the minimum energy and the value of each bit when the minimum energy is obtained.

The update target bit information is also supplied to the cores 33a2 to 33aM from the previous-stage core and is updated in the same way.

When the flag included in the update target bit information is 0, the cores 33a1 to 33aM add an incremental value to the current offset value.

The cores 33a1 to 33aM repeat the process of updating the Ising model state as described above, and reduce the value of the temperature parameter based on the temperature schedule information each time the number of times of the updating process reaches a predetermined number. Furthermore, when the number of times of the updating process reaches the number of repetitions received from the control device 31, the cores 33a1 to 33aM transmit a notification of completion of the update process to the control device 31 via the shared bus 34.

Upon receiving the completion notification from the cores 33a1 to 33aM, the control device 31 transmits an output request for the search result to the cores 33a1 to 33aM via the shared bus 34. Upon receiving the output request for the search result, the cores 33a1 to 33aM transmit the search result (calculation result of the optimization problem) of the ground state of the Ising model to the control device 31. The search result is, for example, the value of each bit when the minimum energy held in the state updating unit 42 is obtained when the number of times of the updating process reaches the number of repetitions received from the control device 31. Alternatively, the search result may be the value of each bit when the number of times of the updating process reaches the number of repetitions. Further, the search result may include energy or minimum energy.

One of the cores 33a1 to 33aM may update the energy, the minimum energy and the value of each bit when the minimum energy is obtained. In that case, the control device 31 acquires the search result from the one core.

The control device 31 outputs (displays) the obtained search result to a display device (not illustrated). The control device 31 may store the search result in the storage device 32.

Figure 8:
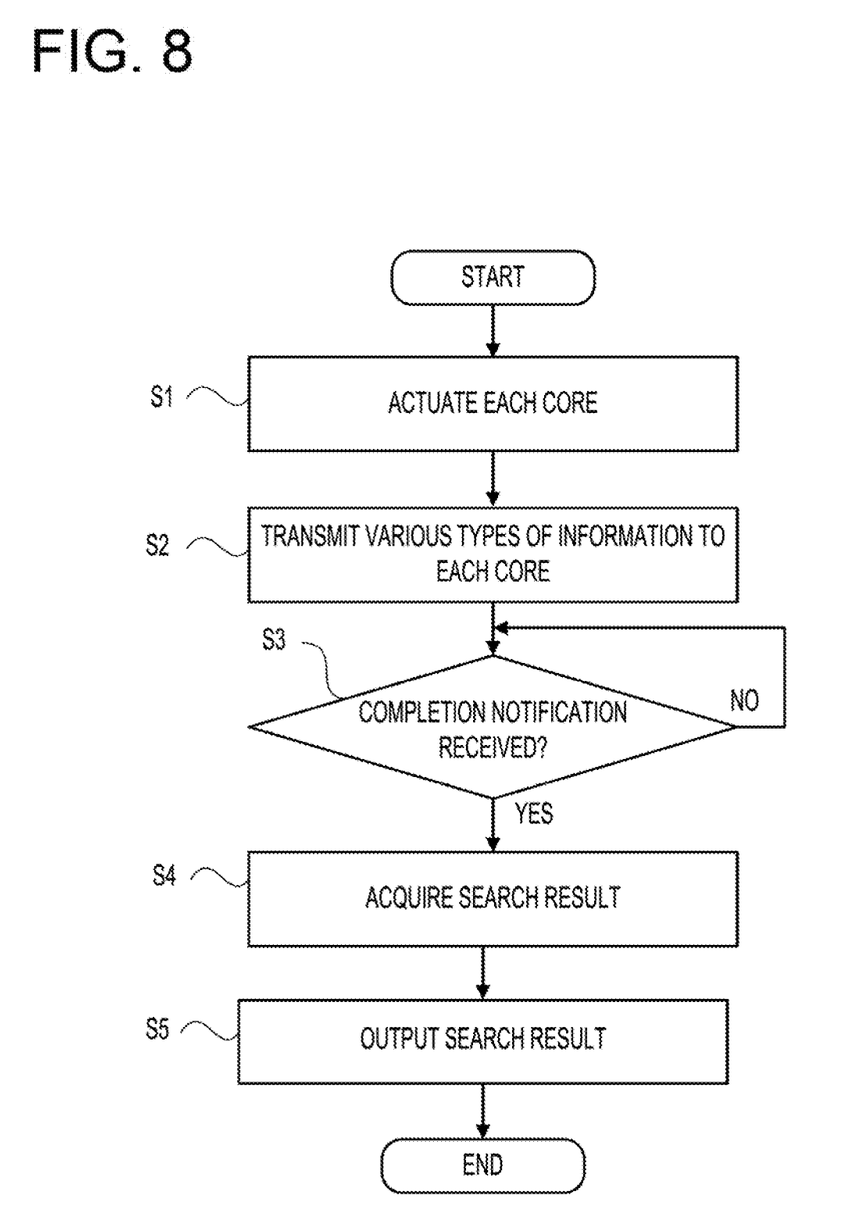
FIG. 8 is a flowchart illustrating the flow of an example of control of the optimization device by a controller.

FIG. 8 is a flowchart illustrating a flow of an example of control of the optimization device by the controller.

The control device 31 activates each of the cores 33a1 to 33aM via the shared bus 34 (step S1), and transmits various types of information such as information of the Ising model to each core (step S2).

Then, the control device 31 determines whether or not a completion notification of the updating process has been received from each core (step S3). The step S3 is repeated until the completion notification is received.

Upon receiving the completion notification from each core, the control device 31 acquires the above-described search result (step S4), outputs the search result (step S5), and ends the process. The control device 31 may repeat the steps S2 to S5 while changing the calculation conditions such as the temperature schedule information.

According to the optimization device 30 of the second embodiment as described above, each of the cores 33a1 to 33aM uses an integrated value of update permission bits sent from the previous-stage core to select an update candidate bit at the above-mentioned probability. This makes it possible to achieve a large scale using the cores 33a1 to 33aM connected in a ring shape, without causing a bias in the selection probability of update target bits.

In the above description, the core 33a1 is the first-stage core and the core 33aM is the M-th-stage core. However, the present disclosure is not limited thereto. For example, based on the information for determining the core type supplied to the cores 33a1 to 33aM from the control device 31, the controller 40 may cause the selection unit 46 to function as a selection unit for the first-stage core or may cause the output processing unit 47 to function as an M-th-stage output processing unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optimization device, comprising:
   M-stage (M is an integer of 2 or more) arithmetic processing circuits connected in a ring shape,
   wherein each arithmetic processing circuit of the M-stage arithmetic processing circuits includes:
   a determination circuit configured to
   determine whether to permit updating for each of first bits based on information of an Ising model, a number of the first bits being obtained by dividing a number of second bits corresponding to all spins of the Ising model by M, the Ising model being obtained by converting an optimization problem;
   a first selection circuit configured to:
   select one update candidate bit from among update permission bits, for which updating is permitted, based on a determination result of the determination circuit; and
   output identification information of the one update candidate bit;
   a count circuit configured to
   count a number of the update permission bits; and
   a state update circuit configured to
   update a value of any one of the second bits based on identification information supplied from a last stage arithmetic processing circuit of the M-stage arithmetic processing circuits to a top stage arithmetic processing circuit of the M-stage arithmetic processing circuits,
   wherein each arithmetic processing circuit of the M-stage arithmetic processing circuits other than the top stage arithmetic processing circuit includes:
   a second selection circuit configured to:
   select first identification information output from the first selection circuit at a first probability obtained by dividing the number of the update permission bits by a sum of the number of the update permission bits and a number supplied from a previous stage arithmetic processing circuit; and
   select second identification information supplied from the previous stage arithmetic processing circuit at a second probability obtained by subtracting the first probability from 1,
   wherein the second selection circuit of the last stage arithmetic processing circuit is configured to
   supply the selected identification information to the top stage arithmetic processing circuit,
   wherein each of the second selection circuits other than the second selection circuit of the last stage arithmetic processing circuit is configured to
   supply the selected identification information to a subsequent stage arithmetic processing circuit.

2. The optimization device according to claim 1, wherein
   the M-stage arithmetic processing circuits are connected to a control device configured to control the M-stage arithmetic processing circuits via a first bus, and are connected in a ring shape by a second bus whose communication speed is higher than a communication speed of the first bus, and
   the M-stage arithmetic processing circuits use the second bus to transmit and receive the selected identification information.

3. The optimization device according to claim 1, wherein the first selection circuit includes:
   a random number generation circuit configured to generate a random number value;
   a selection signal generation circuit configured to generate a selection signal for selecting one of the update permission bits based on the random number value and the number of the update permission bits; and
   a data selection circuit configured to output the identification information of the one update candidate bit based on the selection signal.

4. The optimization device according to claim 1, wherein the second selection circuit includes:
   a selection signal generation circuit configured to generate a selection signal for selecting the first identification information at the first probability; and
   a data selection circuit configured to output the selected identification information based on the selection signal.

5. A method of controlling an optimization device, the method comprising:
   determining, by a determination circuit, whether to permit updating for each of first bits based on information of an Ising model, a number of the first bits being obtained by dividing a number of second bits corresponding to all spins of the Ising model by M, the Ising model being obtained by converting an optimization problem, the determination circuit being included in each arithmetic processing circuit of M-stage arithmetic processing circuits connected in a ring shape, the M-stage arithmetic processing circuits being included in the optimization device;
   selecting, by a first selection circuit, one update candidate bit from among update permission bits, for which updating is permitted, based on a determination result of the determination circuit, the first selection circuit being included in each arithmetic processing circuit of the M-stage arithmetic processing circuits;
   outputting, by the first selection circuit, identification information of the one update candidate bit;
   counting, by a count circuit, a number of the update permission bits, the count circuit being included in each arithmetic processing circuit of the M-stage arithmetic processing circuits;
   updating, by a state update circuit, a value of any one of the second bits based on identification information supplied from a last stage arithmetic processing circuit of the M-stage arithmetic processing circuits to a top stage arithmetic processing circuit of the M-stage arithmetic processing circuits, the state update circuit being included in each arithmetic processing circuit of the M-stage arithmetic processing circuits;
   selecting, by a second selection circuit, first identification information output from the first selection circuit at a first probability obtained by dividing the number of the update permission bits by a sum of the number of the update permission bits and a number supplied from a previous stage arithmetic processing circuit, the second selection circuit being included in each arithmetic processing circuit of the M-stage arithmetic processing circuits other than the top stage arithmetic processing circuit;

selecting, by the second selection circuit, second identification information supplied from the previous stage arithmetic processing circuit at a second probability obtained by subtracting the first probability from 1;

supplying, by the second selection circuit of the last stage arithmetic processing circuit, the selected identification information to the top stage arithmetic processing circuit; and supplying, by each of the second selection circuits other than the second selection circuit of the last stage arithmetic processing circuit, the selected identification information to a subsequent stage arithmetic processing circuit.

* * * * *